(12) United States Patent
Yamashita et al.

(10) Patent No.: US 9,367,311 B2
(45) Date of Patent: Jun. 14, 2016

(54) MULTI-CORE PROCESSOR SYSTEM, SYNCHRONIZATION CONTROL SYSTEM, SYNCHRONIZATION CONTROL APPARATUS, INFORMATION GENERATING METHOD, AND COMPUTER PRODUCT

(71) Applicant: FUJITSU LIMITED, Kawasaki-shi, Kanagawa (JP)

(72) Inventors: Koichiro Yamashita, Hachioji (JP); Hiromasa Yamauchi, Kawasaki (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 608 days.

(21) Appl. No.: 13/765,338

(22) Filed: Feb. 12, 2013

(65) Prior Publication Data

US 2013/0179666 A1  Jul. 11, 2013

Related U.S. Application Data

(63) Continuation of application No. PCT/JP2010/064740, filed on Aug. 30, 2010.

(51) Int. Cl.
*G06F 9/30* (2006.01)
*G06F 9/38* (2006.01)
(Continued)

(52) U.S. Cl.
CPC ............ *G06F 9/30043* (2013.01); *G06F 8/441* (2013.01); *G06F 8/451* (2013.01);
(Continued)

(58) Field of Classification Search
None
See application file for complete search history.

(56) References Cited

U.S. PATENT DOCUMENTS 5,222,229 A * 6/1993 Fukuda .................. G06F 15/167
                                                          709/248
5,440,750 A * 8/1995 Kitai ......................... G06F 9/52
                                                          709/248

(Continued)

FOREIGN PATENT DOCUMENTS

CN        101593097 A     12/2009
JP         01-048163       2/1989

(Continued)

OTHER PUBLICATIONS

Chinese Office Action issued Dec. 3, 2014; Chinese Application No. 201080068873.6, with English Translation.

(Continued)

*Primary Examiner* — Eric Coleman
(74) *Attorney, Agent, or Firm* — Arent Fox LLP

(57) ABSTRACT

A multi-core processor system includes a given core that includes a detecting unit that detects migration of a thread under execution by a synchronization source core to a synchronization destination core in the multi-core processor; an identifying unit that refers to a table identifying a combination of a thread and a register associated with the thread, and identifies a particular register corresponding to the thread for which migration was detected; a generating unit that generates synchronization control information identifying the synchronization destination core and the particular register; and a synchronization controller that, communicably connected to the multi-core processor, acquires from the given core, the synchronization control information, reads in from the particular register of the synchronization source core, a value of the particular register obtainable from the synchronization control information, and writes to the particular register of the synchronization destination core, the value.

8 Claims, 13 Drawing Sheets

(51) Int. Cl.
*G06F 9/48* (2006.01)
*G06F 9/45* (2006.01)
*G06F 12/08* (2016.01)

(52) U.S. Cl.
CPC .......... *G06F 8/458* (2013.01); *G06F 9/30123* (2013.01); *G06F 9/3828* (2013.01); *G06F 9/3834* (2013.01); *G06F 9/3851* (2013.01); *G06F 9/3891* (2013.01); *G06F 9/4856* (2013.01); *G06F 12/0831* (2013.01)

(56) References Cited

U.S. PATENT DOCUMENTS

| | | | | |
|---|---|---|---|---|
| 5,860,108 | A * | 1/1999 | Horikawa | G06F 12/0817 709/213 |
| 6,769,121 | B1 * | 7/2004 | Koyama | G06F 9/4862 709/201 |
| 6,976,155 | B2 * | 12/2005 | Drysdale | G06F 9/544 710/305 |
| 7,080,225 | B1 * | 7/2006 | Todd | G06F 3/061 711/154 |
| 2003/0014471 | A1 | 1/2003 | Ohsawa et al. | |
| 2005/0039167 | A1 | 2/2005 | Fernandes et al. | |
| 2005/0050305 | A1 * | 3/2005 | Kissell | G06F 8/4442 712/220 |
| 2005/0120194 | A1 | 6/2005 | Kissell | |
| 2006/0069832 | A1 | 3/2006 | Imaizumi | |
| 2007/0204268 | A1 * | 8/2007 | Drepper | G06F 9/461 718/102 |
| 2009/0164755 | A1 | 6/2009 | Bell, Jr. et al. | |
| 2009/0165014 | A1 * | 6/2009 | Park | G06F 9/5088 718/105 |
| 2009/0187912 | A1 * | 7/2009 | Lee | G06F 9/4856 718/103 |
| 2010/0125717 | A1 * | 5/2010 | Navon | G06F 9/3851 712/30 |
| 2010/0199280 | A1 * | 8/2010 | Vestal | G06F 9/4881 718/102 |

FOREIGN PATENT DOCUMENTS

| | | |
|---|---|---|
| JP | 64-48163 A | 2/1989 |
| JP | 4-195664 A | 7/1992 |
| JP | 8-234997 A | 9/1996 |
| JP | 2001-236221 A | 8/2001 |
| JP | 2003-029984 A | 1/2003 |
| JP | 2006-99156 A | 4/2006 |
| JP | 2010-92101 A | 4/2010 |

OTHER PUBLICATIONS

Bertozzi et al., "Supporting Task Migration in Multi-Processor Systems-on-Chip: A Feasibility Study," Design, Automation and Test in Europe, Mar. 6, 2006, Piscataway, NJ, pp. 1-6.

Milojicic et al., "Process Migration," retrieved from the internet: URL:http://www.hpl.hp.com/techreports/1999/HPL-1999921.pdf, Nov. 17, 2011, pp. 0-48.

Supplementary European Search Report issued in EP 10 85 6664, mailed Jul. 13, 2013, 7 pages.

* cited by examiner

FIG.7

| SYNCHRO-NIZATION FLAG [1 BIT] | RESERVE [15 BITS] | SYNCHRONIZATION OBJECT REGISTER NAME [8 BITS] | SYNCHRONIZATION DESTINATION CPU NUMBER [8 BITS] |
|---|---|---|---|

603

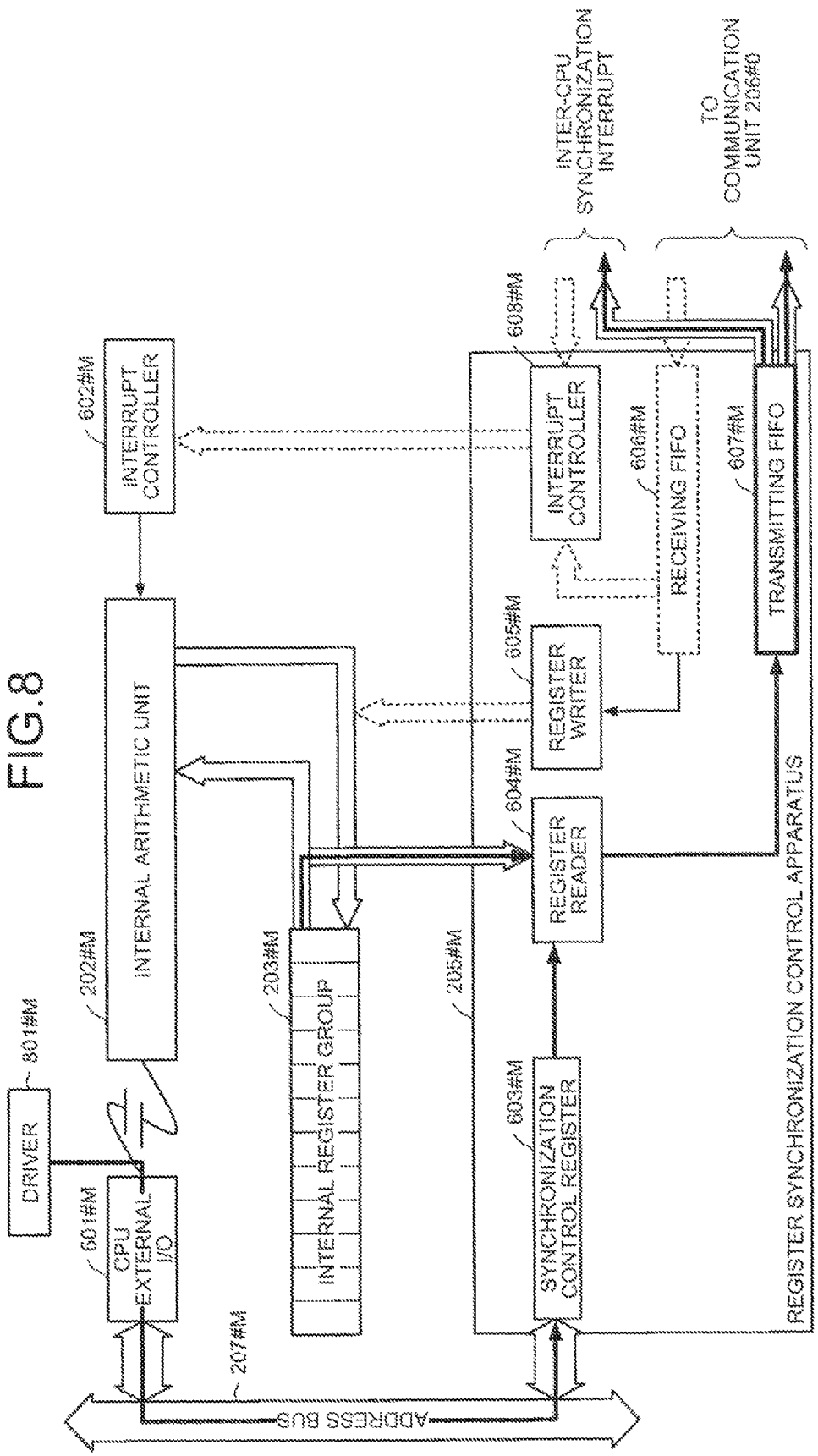

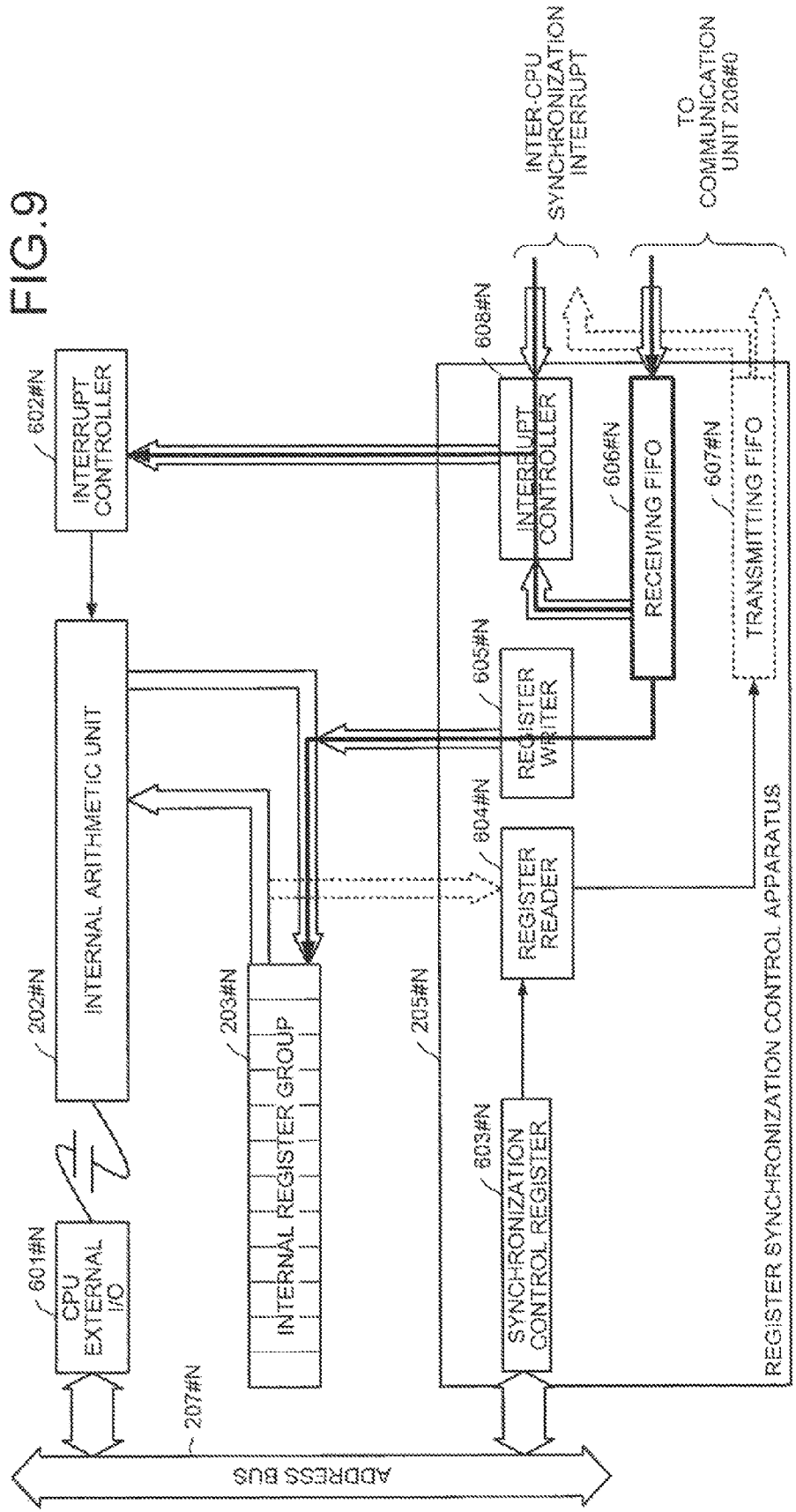

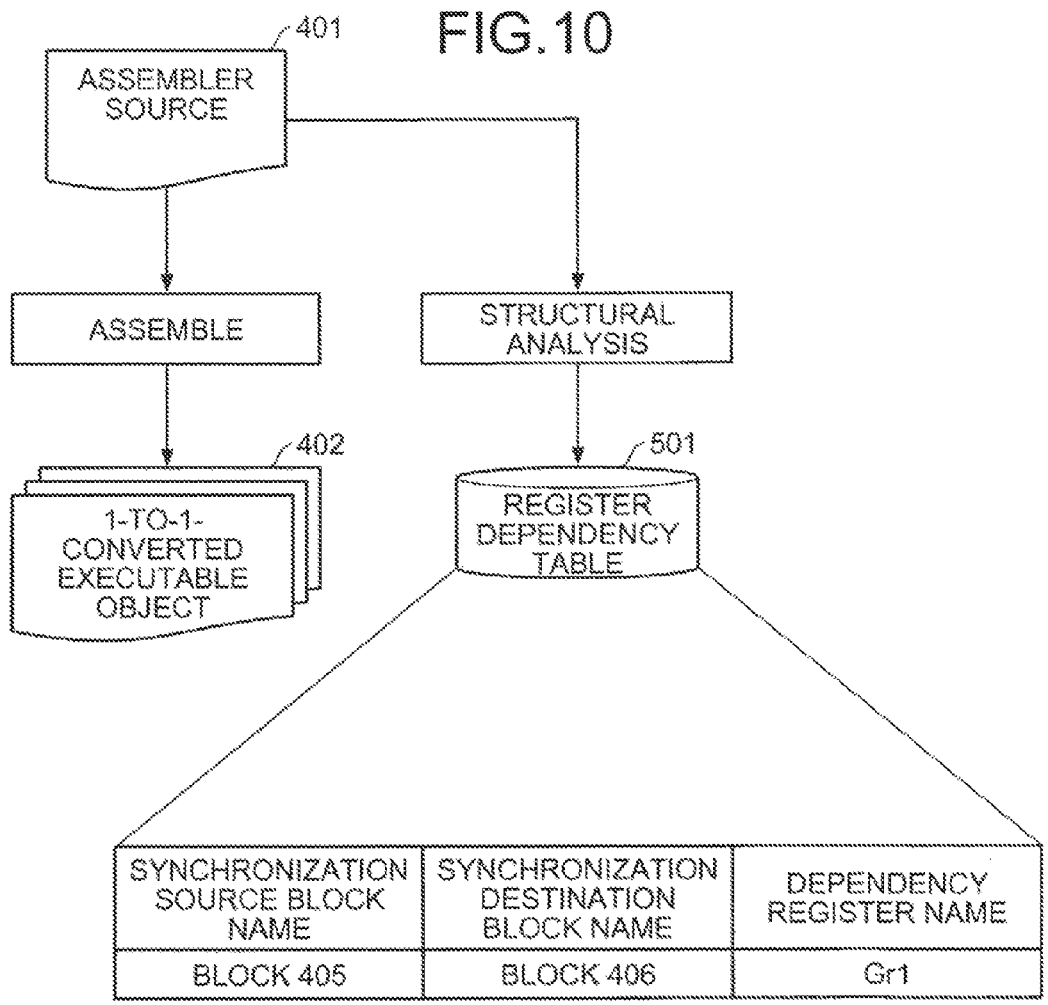

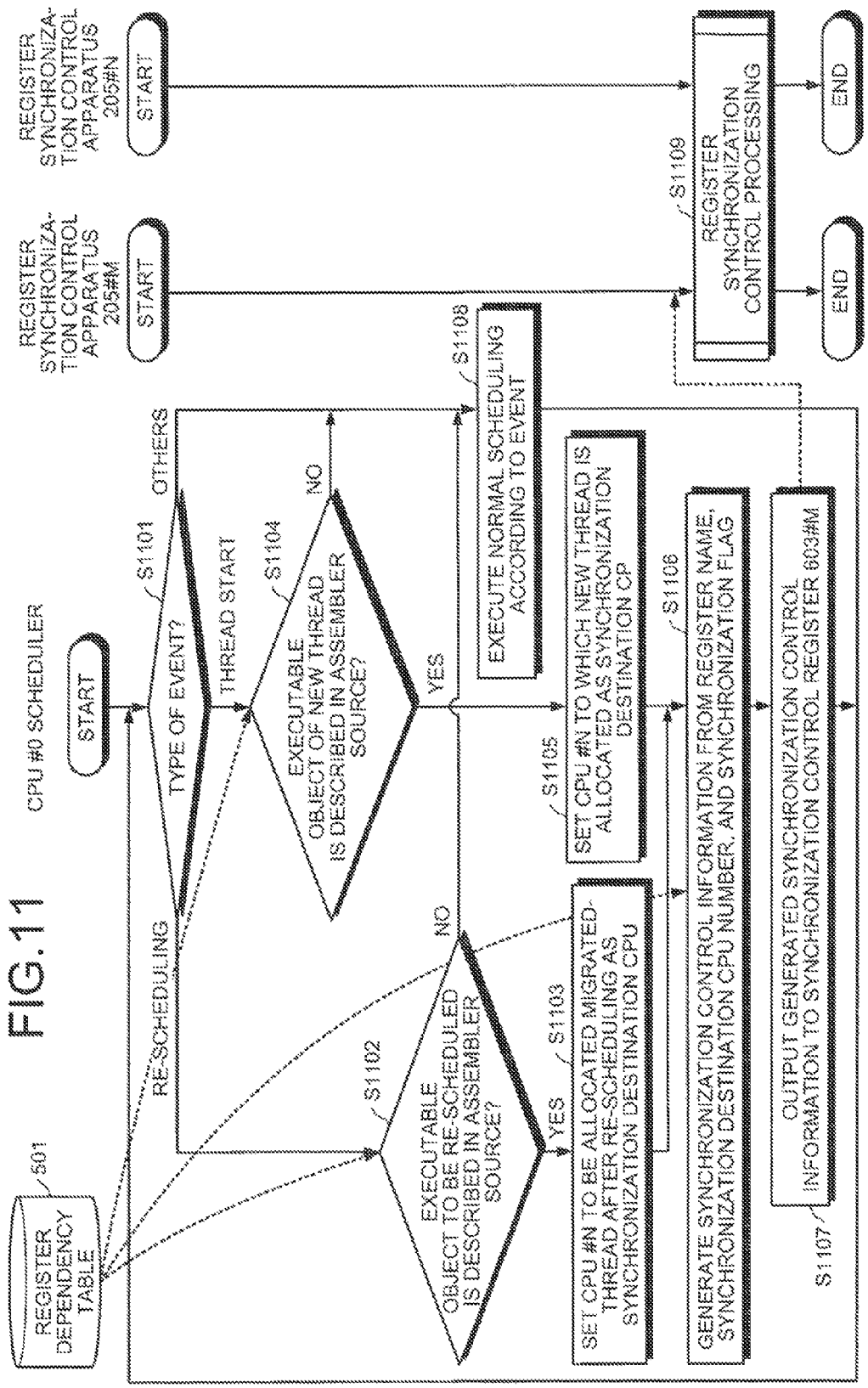

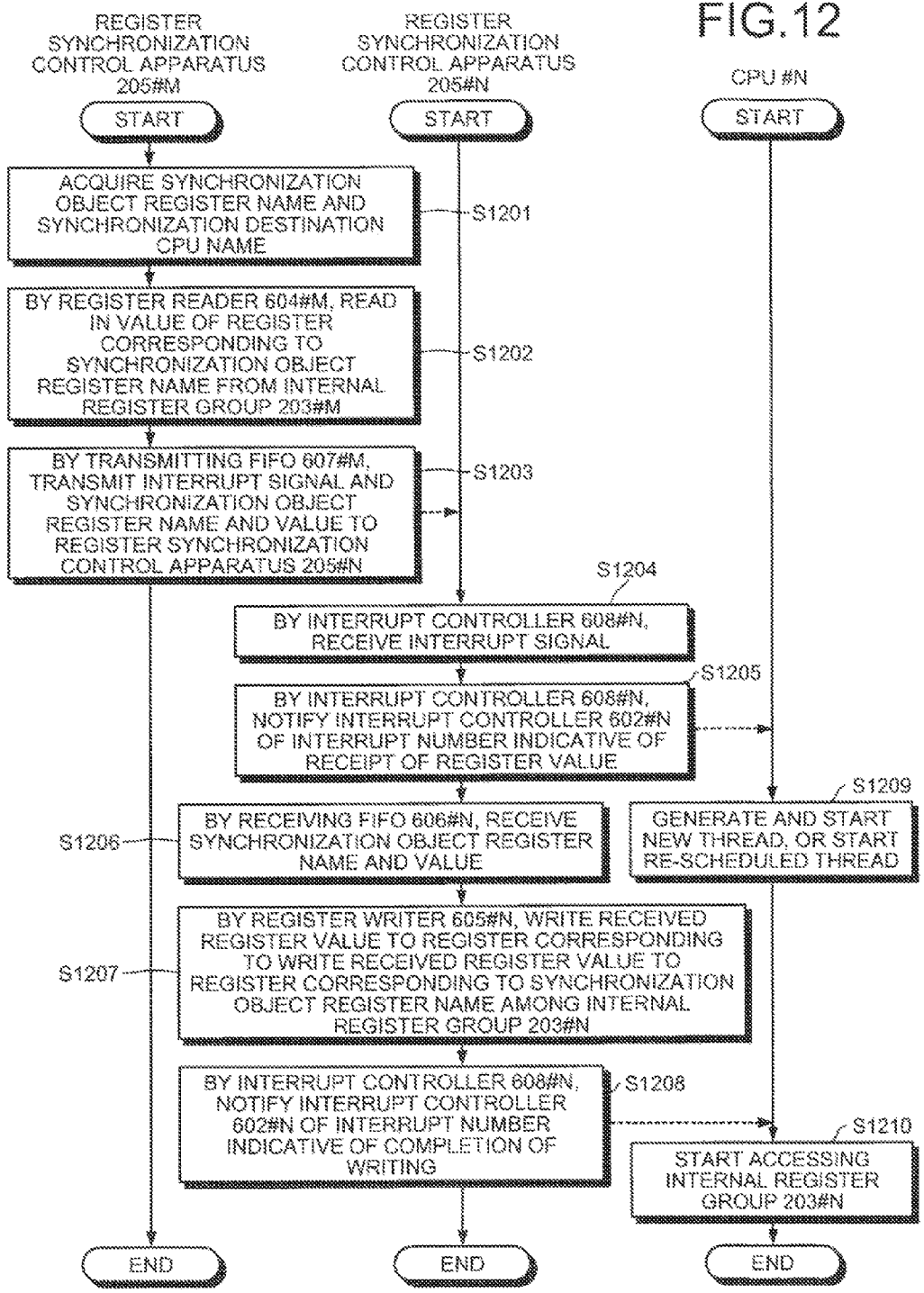

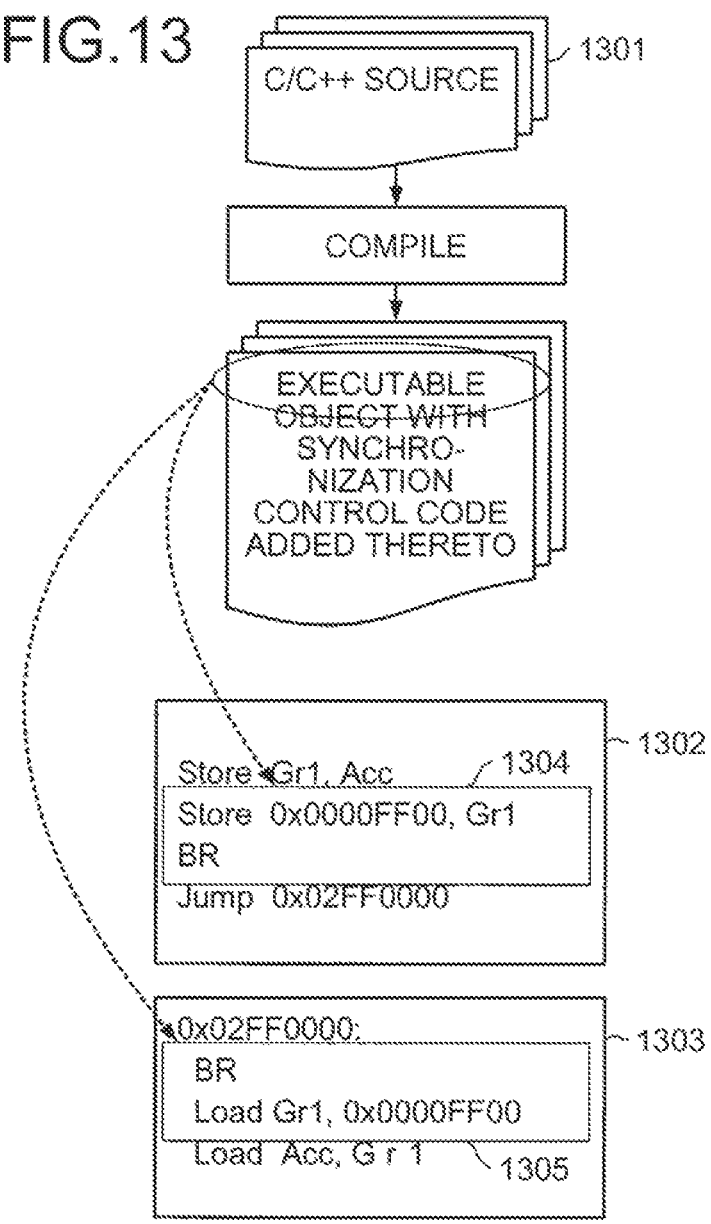

MULTI-CORE PROCESSOR SYSTEM, SYNCHRONIZATION CONTROL SYSTEM, SYNCHRONIZATION CONTROL APPARATUS, INFORMATION GENERATING METHOD, AND COMPUTER PRODUCT

CROSS REFERENCE TO RELATED APPLICATIONS

This application is a continuation application of International Application PCT/JP2010/064740, filed on Aug. 30, 2010 and designating the U.S., the entire contents of which are incorporated herein by reference.

FIELD

The embodiments discussed herein are related to a multi-core processor system, a synchronization control system, a synchronization control apparatus, an information generating method, and an information generating program that control synchronization among registers.

BACKGROUND

Recently, there is an increasing number of devices taking the form of a multi-core processor, which is a computer having plural processor cores, rather than the form of a single-core processor, which is the computer with one processor core mounted thereon. In the case of applying a conventional software asset for the single core to the multi-core processor, since one program is executed by plural cores, inheritance of resister values must be taken into consideration.

For example, with respect to technologies regarding generation of an executable object, a technology has been disclosed of implementing a register as a temporary register on an assembler program and judging the live range of the temporary register by flow analysis, replacing the temporary register with an actual register, at the assembly stage (see, e.g., Japanese Laid-Open Patent Publication No, H8-234997). The technology according to Japanese Laid-Open Patent Publication No. H8-234997 can clarify the live range of the register. This technology, therefore, makes it possible to avoid an unnecessary insertion of synchronization processing or a missed insertion of the synchronization processing in the case of changing assembler code written for the single core to be will processed in parallel by the multi-core processor system.

With respect to technologies regarding load distribution within a multi-core processor system, for example, a technology has been disclosed of providing processing modules with profile information and determining the processing module to be executed by each core based on the profile information (see, e.g., Japanese Laid-Open Patent Publication No. 2006-99156). With respect to hardware technologies for parallel processing in a multi-core processor system, a technology has been disclosed that enables easy data transfer by having a 2-port register accessible by plural cores (see, e.g., Japanese Laid-Open Patent Publication No. H01-048163).

With respect to a method of synchronizing registers of the multi-core processor system, there is the technology using the cache coherency mechanism (hereinafter referred to as "conventional technology 1"). For example, in the case of synchronizing the register of a given core and the register of another core, firstly, the given core writes the value of the register to a cache memory. The cache coherency mechanism, upon detecting the writing of the register value into the cache memory, notifies the cache memory of the other core of the register value. Lastly, the other core reads in the register value from the cache memory of the given core and writes the value to the register of the other core. A sequence of operations described above makes it possible to synchronize the registers.

With respect to the method of synchronizing registers of the multi-core processor system, for example, a technology has been disclosed of preparing a specialized instruction to perform the synchronization (see, Japanese Laid-Open Patent Publication No. H04-195664). With the technology according to Japanese Laid-Open Patent Publication No. H04-195664, when a given core has executed the specialized instruction, the given core transmits the register value to another core and enters a suspended state until the other core executes a register transfer instruction, enabling processing equivalent to that of the conventional technology 1 to be executed by software, in one step.

FIG. 13 is an explanatory diagram of a register synchronizing method at the time of execution of a C program or a C++ program in the multi-core processor system of a conventional example. At the time of design, a compiler reads in a C/C++ source 1301 as a C source or a C++ source and generates a block 1302 and a block 1303 as a part of the executable object having synchronization control code added thereto. Portions corresponding to the synchronization control code are a block 1304 and a block 1305. For example, the C/C++ source 1301 includes two statements of "A=A+1;func(A);" and the block 1302 and the block 1303 are the executable objects corresponding to the two statements.

In the example of FIG. 13, even if the block 1302 and the block 1303 are executed by different CPUs, the blocks 1304 and 1305 make it possible to synchronize a register Gr1, enabling proper operation. For example, the block 1304 stores the value of register Gr1 to 0x0000FF00 designating an area of the cache memory, etc. Then, the block 1305 reads in the value stored at 0x0000FF00 and sets the value to the register Gr1. Thus, an executable object for a multi-core processor can be generated from a program for a single core by adding synchronization control code at the time of compiling (hereinafter referred to as "conventional technology 2").

Among the technologies described above, however, the conventional technology 1, the conventional technology 2, and the technology according to Japanese Laid-Open Patent Publication No. H04-195664 newly add the synchronization control code. Therefore, when the conventional technology 1, the conventional technology 2, and the technology according to Japanese Laid-Open Patent Publication No. H04-195664 are applied to the assembler source, there has been a problem that the executable code is changed to the executable object to be generated. The assembler source is generated by a designer, for example, when he desires to reduce the number of instructions even by one step. Therefore, the assembler source is expected to be converted to machine language one to one and a careless addition of the executable code has given rise to, a problem that the volume of code quantity becomes greater than that intended by the designer.

SUMMARY

According to an aspect of an embodiment, a multi-core processor system includes a given core that includes a detecting unit that detects migration of a thread under execution by a synchronization source core to a synchronization destination core in the multi-core processor, an identifying unit that refers to a table identifying a combination of a thread of a thread group and a register associated with the thread, and identifies a particular register corresponding to the thread for which migration was detected by the detecting unit, and a generating unit that generates synchronization control information identifying the synchronization destination core and the particular register identified by the identifying unit; and a synchronization controller that, communicably connected to the multi-core processor, acquires from the given core, the synchronization control information generated by the generating unit, reads in from the particular register of the synchronization source core, a value of the particular register obtainable from the synchronization control information, and writes to the particular register of the synchronization destination core, the value read in from the particular register of the synchronization source core.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is an explanatory diagram of one example of memory contents of a synchronization control register 603;

FIG. 8 is an explanatory diagram of an overview of the register synchronization control apparatus 205 of the synchronization source CPU at the time of occurrence of the synchronization event;

FIG. 9 is an explanatory diagram of an overview of the register synchronization control apparatus 205 of the synchronization destination CPU at the time of occurrence of the synchronization event;

FIG. 10 is an explanatory diagram of an overview at the time of design of the multi-core processor system 100;

FIG. 11 is a flowchart of scheduling;

FIG. 12 is a flowchart of register synchronization control processing; and

FIG. 13 is an explanatory diagram of a register synchronizing method at the time of execution of a C program or a C++ program in the multi-core processor system of a conventional example.

DESCRIPTION OF EMBODIMENTS

With reference to the accompanying drawings, preferred embodiments of a multi-core processor system, a synchronization control system, a synchronization control apparatus, an information generating method, and an information generating program according to the present invention will be described in detail.

Figure 1:
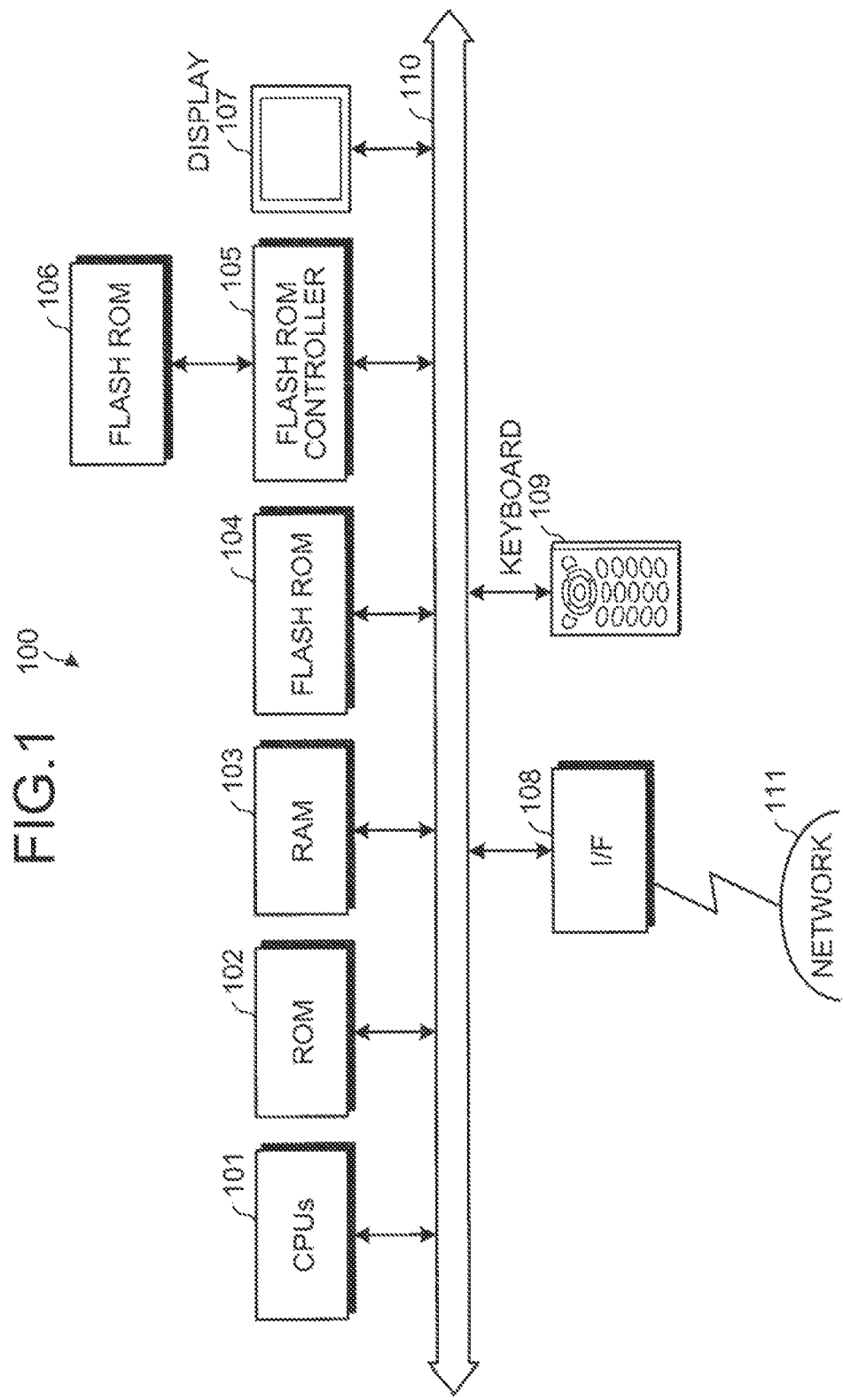
FIG. 1 is a block diagram of a hardware configuration of a multi-core processor system 100 according to an embodiment.

FIG. 1 is a block diagram of a hardware configuration of a multi-core processor system 100 according to an embodiment. As depicted in FIG. 1, a multi-core processor system 100 includes plural central processing units (CPUs) 101, read-only memory (ROM) 102, random access memory (RAM) 103, flash ROM 104, a flash ROM controller 105, and flash ROM 106. The multi-core processor system includes a display 107, an interface (I/F) 108, and a keyboard 109, as input/output devices for the user and other devices. The components of the multi-core system 100 are respectively connected by a bus 110.

The CPUs 101 govern overall control of the multi-core processor system 100. The CPUs 101 refer to CPUs that are single core processors connected in parallel. The CPUs 101 include a CPU # and a CPU #1. Nonetheless, the CPUs 101 may include 3 or more CPUs. The CPUs #0 and #1 have a dedicated cache memory, respectively. The multi-core processor system is a computer system that includes plural cores and may be configured by a single processor having plural cores or a group of single-core processors connected in parallel. In the present embodiment, description will be given taking a group of single-core processors (CPUs) connected in parallel as an example.

The CPUs #0 and #1 respectively have a dedicated register and a dedicated register synchronization control apparatus as a feature of the present embodiment. Details of the register synchronization control apparatus will be described with reference to FIG. 2.

The ROM 102 stores therein programs such as a boot program. The RAM 103 is used as a work area of the CPUs 101. The flash ROM 104 stores system software such as an operating system (OS), and application software. For example, when the OS is updated, the multi-core processor system 100 receives a new OS via the I/F 108 and updates the old OS that is stored in the flash ROM 104 with the received new OS.

The flash ROM controller 105, under the control of the CPUs 101, controls the reading and writing of data with respect to the flash ROM 106. The flash ROM 106 stores therein data written under control of the flash ROM controller 105. Examples of the data include image data and video data acquired by the user of the multi-core processor system through the I/F 108. A memory card, SD card and the like may be adopted as the flash ROM 106.

The display 107 displays, for example, data such as text, images, functional information, etc., in addition to a cursor, icons, and/or tool boxes. A thin-film-transistor (TFT) liquid crystal display and the like may be employed as the display 107.

The I/F 108 is connected to a network 111 such as a local area network (LAN), a wide area network (WAN), and the Internet through a communication line and is connected to other apparatuses through the network 111. The I/F 108 administers an internal interface with the network 111 and controls the input and output of data with respect to external apparatuses. For example, a modem or a LAN adaptor may be employed as the I/F 108.

The keyboard 109 includes, for example, keys for inputting letters, numerals, and various instructions and performs the input of data. Alternatively, a touch-panel-type input pad or numeric keypad, etc. may be adopted.

Figure 2:
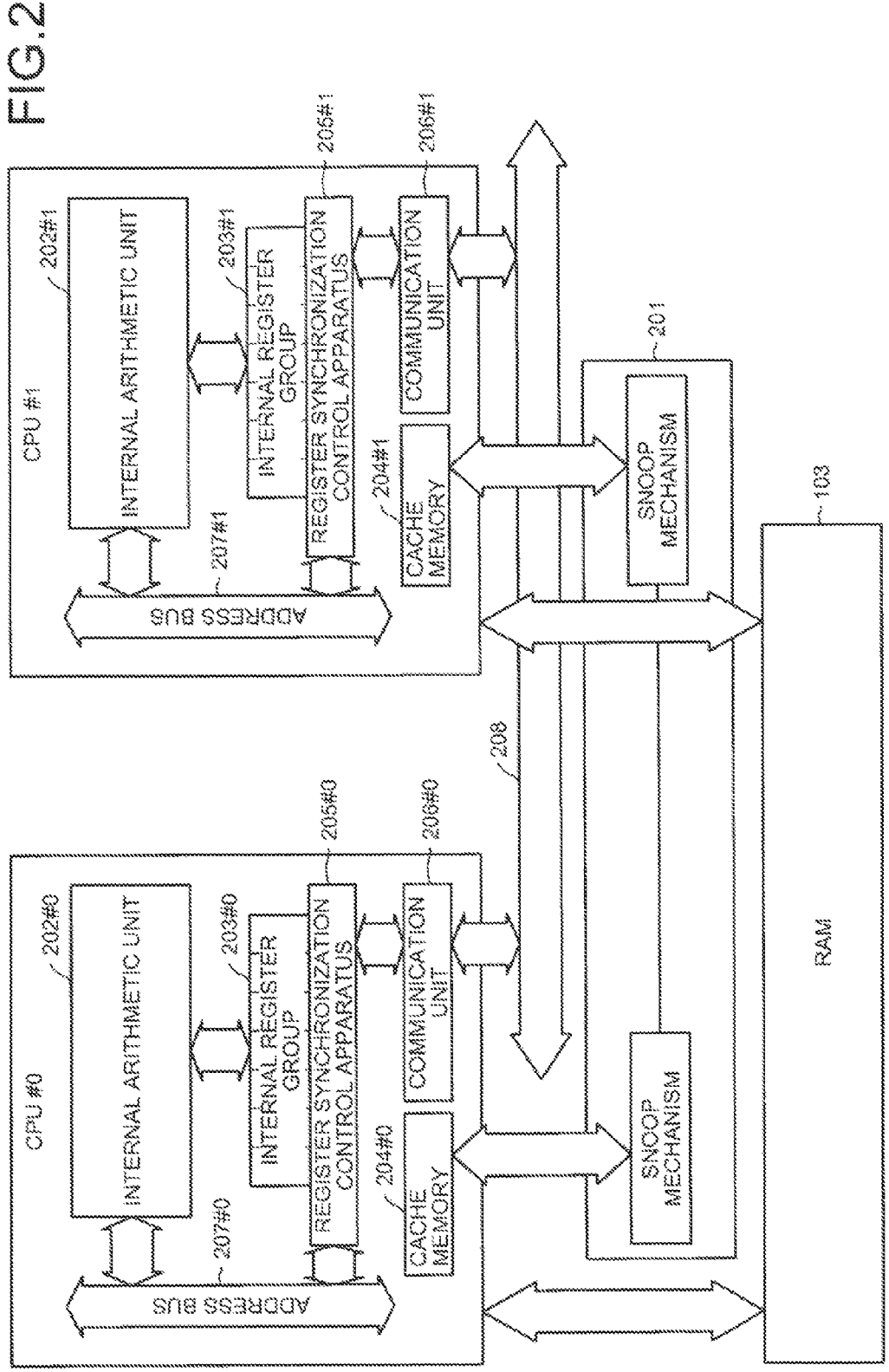
FIG. 2 is a block diagram of a register synchronization control apparatus using a dedicated synchronization line as applied to CPUs 101.

FIG. 2 is a block diagram of the register synchronization control apparatus using a dedicated synchronization line as applied to the CPUs 101. The hardware depicted in FIG. 2 is the CPU #0 and CPU #1 included among the CPUs 101, the RAM 103, and a snoop mechanism 201 as a cache coherency mechanism. The CPU #0 and the CPU #1 respectively include an internal arithmetic unit 202, an internal register group 203, and a cache memory 204. Hereinafter, when either of suffix symbols "#0" and "#1", which correspond to the CPUs #0 and #1, respectively, is added to a hardware or software reference numeral, the suffix symbol indicates the hardware of the corresponding CPU or the software being executed by the corresponding CPU.

Further, the CPUs #0 and #1 respectively include a register synchronization control apparatus 205 and a communication unit 206 as features of the present embodiment. The internal arithmetic unit 202 can access the internal register group 203. The internal arithmetic unit 202 and the register synchronization control apparatus 205 are connected by an address bus 207, and the communication unit 206#0 and the communication unit 206#1 are connected by a dedicated line 208.

The snoop mechanism 201 is a device that establishes coherency of the cache memory 204#0 and the cache memory 204#1 accessed by the CPUs #0 and #1, respectively. The snoop mechanism 201 causes a CPU to control updating of the cache memory thereof and that of other CPUs, and to exchange information concerning updating with other CPUs. The snoop mechanism 201 judges which cache memory has the latest data by causing an exchange of information concerning updating. The snoop mechanism 201 causes a CPU to make changes to or invalidate areas of the cache memory thereof, enabling each cache memory to reflect the latest data.

The internal arithmetic unit 202 is an arithmetic unit to perform an integer arithmetic operation, a logic operation, a bit shift operation, etc. The internal arithmetic unit 202 performs the operations according to an instruction code read in from the RAM 103, etc., using the internal register group 203.

The internal register group 203 is a memory device used by the internal arithmetic unit 202 to perform computations. The internal register group 203 includes various types of purpose-specific registers, such as an accumulator, an address register, a general-purpose register, a program counter, a status register, etc.

An accumulator is a register that stores data temporarily such as storing of results of a computation. An address register is a register used to identify an address when accessing the memory. A general-purpose register is a register that is not designated for a specific purpose and performs various functions according to an instruction, particularly, functions of an accumulator and an address register.

The program counter is a register that indicates the address on the main memory at which the instruction to, be executed next is stored. The status register is a register that stores various states of the processor, e.g., an overflow state resulting from computation, a state of the accumulator being 0, etc. In addition to the accumulator, the address register, the general-purpose register, the program counter, and the status register, a dedicated register may be provided depending on the CPU specifications, such as a floating-point register to handle the floating decimal point.

For example, the internal arithmetic unit 202 fetches instruction data written in machine language from the RAM 103. It is assumed that the instruction data is written as "Store Gr1 Acc#" if expressed mnemonically. "Gr1" indicates the general-purpose register and "Acc#" indicates the accumulator. After fetching the instruction data, the internal arithmetic unit 202 executes the instruction data. In the above example, the internal arithmetic unit 202 stores the value of the accumulator to the general-purpose register "Gr1". The cache memory 204 is a memory area to which a part of the RAM 103 data is copied to enable the CPUs #0 and #1 to access data in the RAM 103 at high speed.

The register synchronization control apparatuses 205 control the synchronization of the internal register group 203#0 and the internal register group 203#1. For example, the register synchronization control apparatus 205#0 and the register synchronization control apparatus 205#1 synchronize the Gr1 register, one of the general-purpose registers, between the CPUs #0 and #1.

Each communication unit 206 is connected to a register synchronization control apparatus 205 and communicates with other register synchronization control apparatuses 205. For example, the communication unit 206#0 transfers the register value of the CPU #0 acquired by the register synchronization control apparatus 205#0 to the register synchronization control apparatus 205#1 by way of the dedicated line 208. Upon receipt of the register value, the communication unit 206#1 notifies the register synchronization control apparatus 205#1 of the register value.

Figure 3:
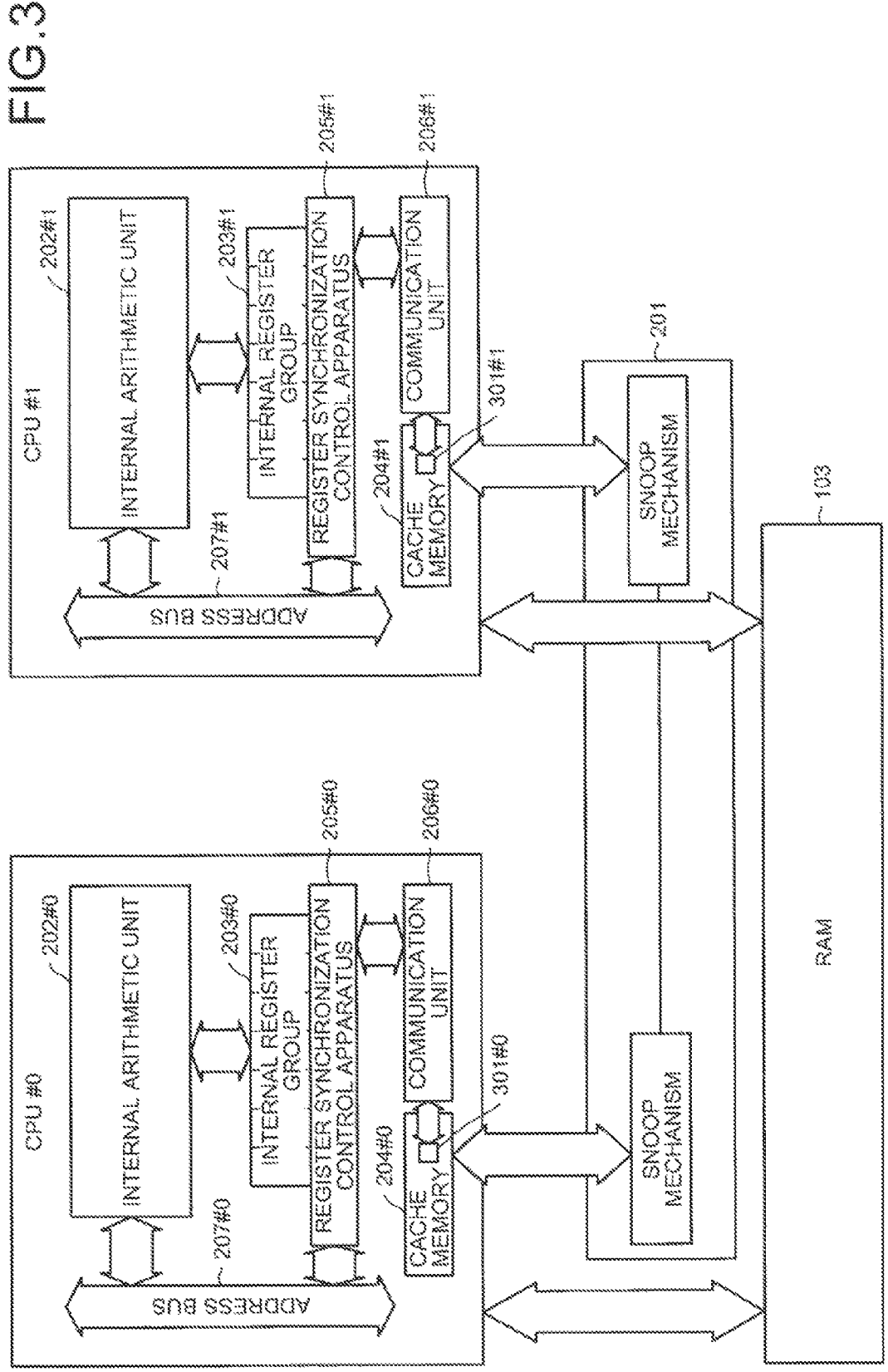
FIG. 3 is a block diagram of the register synchronization control apparatus using a snoop mechanism 201 as applied to the CPUs 101.

FIG. 3 is a block diagram of the register synchronization control apparatus using the snoop mechanism 201 as applied to the CPUs 101. While the communication unit 206#0 and the communication unit 206#1 communicate by the dedicated line 208 in FIG. 2, the communication unit 206#0 and the communication unit 206#1 transfer the register value, etc., using cache memory 204 and the snoop mechanism 201 in FIG. 3.

For example, at the time of design of the multi-core processor system 100, the designer establishes a protected area 301 in the cache memory 204 for the synchronization of the registers. The protected area 301 is an area among the areas of the cache memory 204 and different from an area that is allocated to a CPU, is used by a thread, etc. and in which data are exchanged. The protected area 301 is the area protected against data erasing. Firstly, the communication unit 206#0 writes the register value to the protected area 301#0. Upon detection of the writing to the protected area 301#0, the snoop mechanism 201 copies the contents of the protected area 301#0 to the protected area 301#1. After the copying, the communication unit 206#1 notifies the register synchronization control apparatus 205#1 of the register value written to the protected area 301#1.

Figure 4:
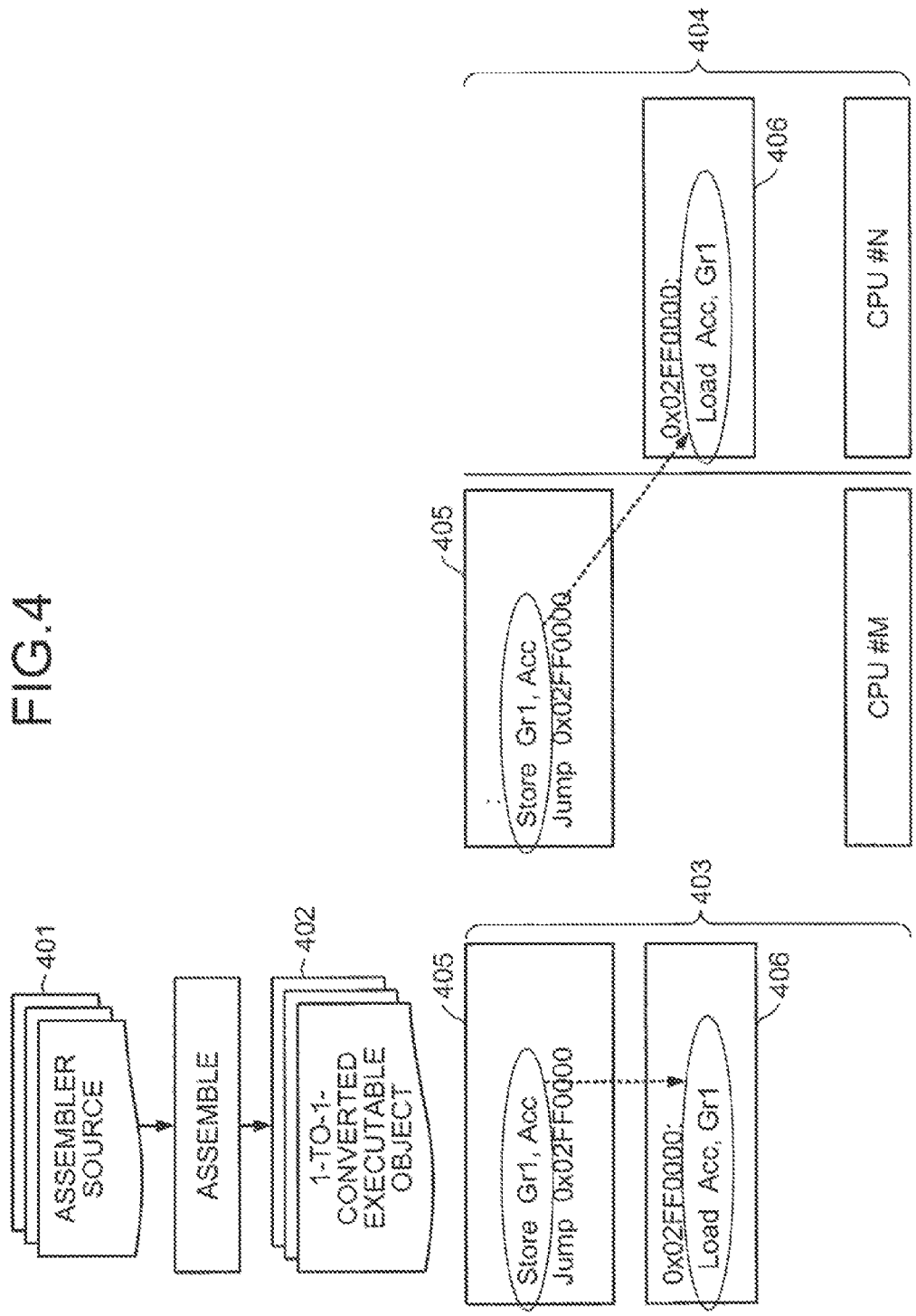
FIG. 4 is an explanatory diagram of the occurrence of a synchronization event.

FIG. 4 is an explanatory diagram of the occurrence of a synchronization event. FIG. 4 depicts the occurrence of the synchronization event consequent to the execution of an executable object 402 from an assembler source 401. Reference numeral 403 indicates execution of an executable object on a single core and reference numeral 404 indicates execution of the executable object on multiple cores.

At the time of design, the assembler reads in the assembler source 401 and generates a one-to-one-converted executable object 402. In the example of FIG. 4, the assembler generates a block 405 and a block 406 as the executable object 402. The assembler source 401 describes two statements of "A=A+1: func(A)" that are same contents as those of the C/C++ source 1301. To execute the two statements with a minimum number of instructions, an intentional synchronization control code is not inserted into the assembler source 401.

As for processing contents of each block, the block 405 describes an instruction to store the value of the accumulator to the register Gr1 and jump to the address of 0x02FF0000 at which func( ) is located and the block 406 describes an instruction to re-read the contents of the register Gr1 to the accumulator.

When the CPU executes the block 405 and the block 406, the CPU generates threads and executes the blocks on the threads. The case indicated by reference numeral 403 assumes that a single core executes the thread by the block 405 and the thread by the block 406. In this case, since the register Gr1 of the block 405 and the register Gr1 of the block 406 are the same, these blocks operate properly.

The case indicated by reference numeral 404 assumes that multi-core operation, such as the execution of the thread by the block 405 by a CPU #M among the CPUs 101 and the execution of the thread by the block 406 by a CPU #N different from the CPU #M. M and N are integers greater than 0. In this case, since the register Gr1 of the block 405 is the register Gr1 of the CPU #M and the register Gr1 of the block 406 is the register Gr1 of the CPU #N, these blocks do not operate properly.

Since equal values of the registers will cause the two blocks to operate properly, for example, synchronization of the register Gr1 of the CPU #M and the register Gr1 of the CPU #N makes it possible to cause the blocks 405 and 406 to operate properly in the multiple cores. For example, the synchronization can be achieved by writing the value of the register Gr1 of the CPU #M over the register Gr1 of the CPU #N.

Hereinafter, it is assumed that a synchronization event has occurred when an event has occurred for synchronizing of the registers between two CPUs for proper operation. The CPU #M as a source of the register synchronization is given as a synchronization source CPU and the CPU #N as a destination of the register synchronization is given as a synchronization destination CPU. Further, in the example of FIG. 4, the thread as a source of the synchronization is given as a synchronization source thread and the thread as a destination of the synchronization is given as a synchronization destination thread. In the example of FIG. 4, the thread by the block 405 is the synchronization source thread and the thread by the block 406 is the synchronization destination thread. When the thread migrates from the synchronization source CPU to the synchronization destination CPU, the synchronization source thread and the synchronization destination thread are the same thread. When the synchronization destination thread is a thread branched from the synchronization source thread, the synchronization source thread and the synchronization destination thread are different threads.

Figure 5:
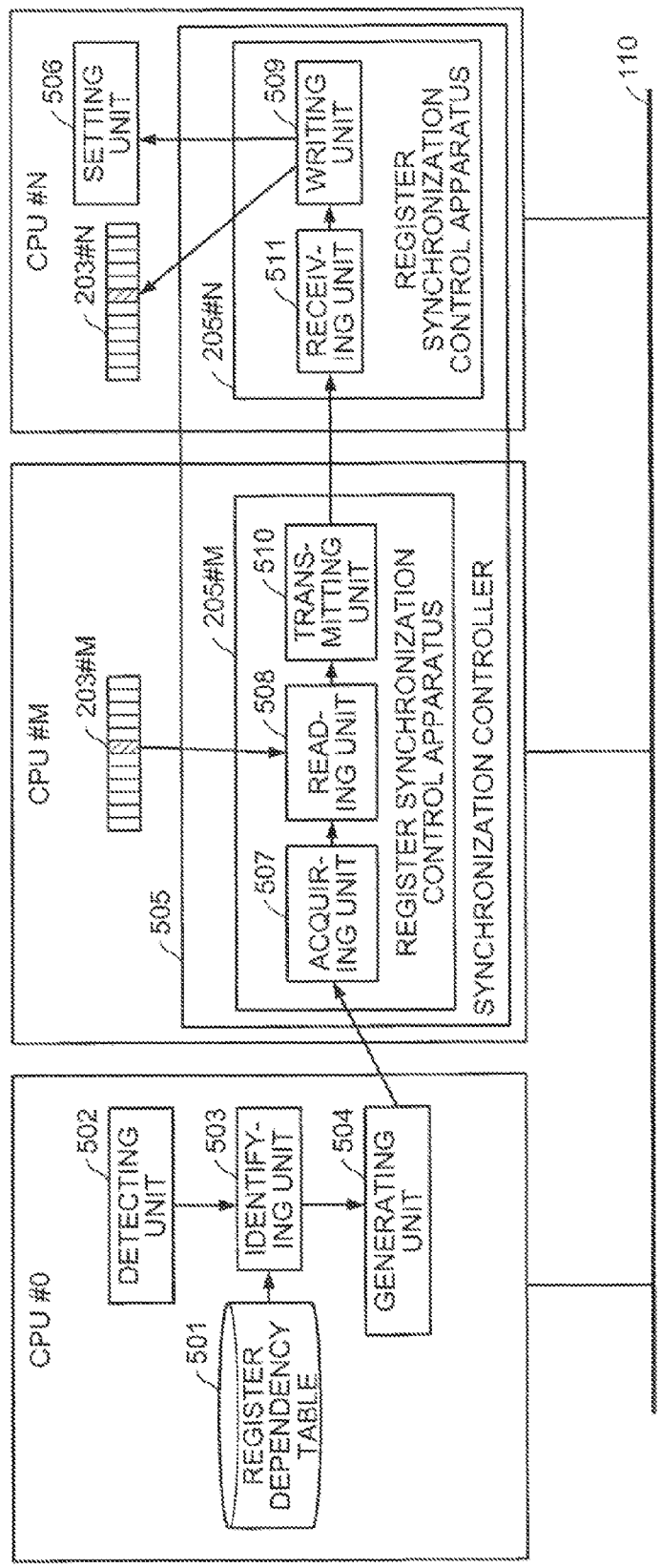
FIG. 5 is a diagram of a functional configuration of the multi-core processor system 100.

Functions will then be described of the multi-core processor system 100. FIG. 5 is a diagram of a functional configuration of the multi-core processor system 100. The multi-core processor system 100 includes a detecting unit 502, an identifying unit 503, a generating unit 504, a synchronization controller 505, a setting unit 506, an acquiring unit 507, a reading unit 508, a writing unit 509, a transmitting unit 510, and a receiving unit 511.

Among functions forming a controller, the detecting unit 502 to the generating unit 504, and the setting unit 506 are implemented by executing on the CPUs 101, a program stored in a memory device. The memory device is, for example, the ROM 102, the RAM 103, the flash ROM 104, the flash ROM 106, etc.

The synchronization controller 505, the acquiring unit 507, the reading unit 508, the writing unit 509, the transmitting unit 510, and the receiving unit 511 are implemented by the register synchronization control apparatus depicted in FIG. 2.

FIG. 5 assumes the CPU #0 to be a master CPU controlling the multi-core processor system 100 and the CPU #M and the CPU #N as CPUs controlled for synchronization between the registers. Alternatively, the CPU #0 may be the master CPU and the CPU to be controlled for synchronization between the registers. For example, when the CPU #0 becomes the master CPU as well as the synchronization destination CPU to be controlled for synchronization between the registers, the CPU #0 may include the setting unit 506 as a function of the CPU #0.

The multi-core processor system 100 can access a register dependency table 501 that identifies each thread of a thread group and a combination of a thread and a register associated with the thread. With respect to the executable object as the object to be executed by the thread, the register dependency table 501 records inter-block information and the register inheriting the value between the blocks at the time of dividing the executable object into parallelly executable blocks. Details of the register dependency table 501 will be described with reference to FIG. 10.

The register associated with the thread in the register dependency table 501 is not required to identify any core of the multi-core processor. For example, the register dependency table 501 stores information of two blocks as a part of the executable object that corresponds to the thread and a register name. The register name is the name of the register held by all CPUs among the CPUs 101 and the register name does not, identify a CPU among the CPUs 101.

The register dependency table 501 is not required to specify memory areas other than the register. For example, the register dependency table 501 stores the register name and does not specify other memory areas of the cache memory 204, the RAM 103, the flash ROM 104, etc.

The detecting unit 502, by a given core among the multi-core processor, has a function of detecting a migration of the thread under execution by a synchronization source core to a synchronization destination core inside the multi-core processor. For example, the detecting unit 502, by the CPU #0 among the CPUs 101, detects migration of the thread under execution by the CPU #M, to the CPU #N.

The detecting unit 502 may detect the generation, in the synchronization destination core, of a second thread branched from a first thread being executed by the synchronization source core. For example, the detecting unit 502 detects the generation, in the CPU #N, of the second thread to be branched from the first thread under execution by the CPU #M. Information of the detection is stored to the memory area of the internal register group 203#0, the cache memory 204#0, the RAM 103, etc.

The identifying unit 503, by a given core, has a function of referring to the register dependency table 501 and identifying a particular register corresponding to the thread whose migration is detected by the detecting unit 502. The identifying unit 503 may identify a particular register corresponding to the first thread under execution by the CPU #M and the second thread branched from the first thread and to be executed in the CPU #N.

For example, the identifying unit 503, by the CPU #0, identifies a suitable record, based on the block of the executable object to be executed by the CPU #M and the block of the executable object to be executed by the CPU #N, among the records of the register dependency table 501. When a suitable record can be identified, the identifying unit 503 identifies the register name stored in the suitable record as the particular register. The information of the identified register is stored to the memory area of the internal register group 203#0, the cache memory 204#0, the RAM 103, etc.

The generating unit 504, by the given core, has a function of generating synchronization control information identifying the particular register identified by the identifying unit 503 and the synchronization destination core. For example, suppose that the Gr1 register has been identified by the identifying unit 503. In this case, the generating unit 504, by the CPU #0, generates the synchronization control information identifying the Gr1 register and the CPU #N.

With respect to a method of identifying the particular register and the synchronization destination core, for example, the synchronization control information stores the name or the identification (ID) of the particular register and the CPU number of the synchronization destination core. The generated synchronization control information is stored in the memory area of the RAM 103, etc. and is stored by a driver of the register synchronization apparatus 205 operating on the synchronization source CPU in a synchronization control register as the memory area of the register synchronization control apparatus 205. The synchronization control register will be described in detail with reference to FIG. 6.

The synchronization controller 505, communicably connected to the multi-core processor, acquires the synchronization control information generated by the generating unit 504 from the given core and reads in the value of the particular register obtainable from the synchronization control information from the particular register of the synchronization source core. The synchronization controller 505 has a function of writing to the particular register of the synchronization destination core, the value read in from the particular register of the synchronization source core. For example, the synchronization controller 505 acquires the synchronization control information from the CPU #0 and reads in the value of the register Gr1 from the register Gr1, among the internal register group 203#M of the CPU #M. The synchronization controller 505 then writes the value read in from the register Gr1 of the CPU #M, to the register Gr1 of the internal register group 203#N of the CPU #N.

When the synchronization controller 505 has written the value read in from the particular register of the synchronization source core, the synchronization controller 505 may notify the synchronization destination core that the detected thread has become executable. The information that the detected thread has become executable is, for example, an interrupt signal and the synchronization controller 505 notifies the synchronization destination core of the interrupt signal. For example, when the synchronization controller 505 has written the value read in from the register Gr1 of the CPU #M, to the register Gr1 among the internal register group 203#N of the CPU #N, the synchronization controller 505 notifies the CPU #N of the interrupt signal.

The setting unit 506, by the synchronization destination core, has a function of setting the detected thread in the state executable by the synchronization destination core. The setting unit 506 may set the detected thread to a state executable by the synchronization destination core, if information indicating that the detected thread has become executable has been received from the synchronization controller 505. For example, the setting unit 506, by the CPU #N, migrates the detected thread and sets the thread in an executable state. When the second thread branched from the first thread under execution by the synchronization source core is generated at the synchronization destination core, the CPU #N secures an area to be accessed by the second thread, for example, thread context, in the RAM 103 and sets the second thread in an executable state.

When the synchronization control information specifying the particular register and the synchronization destination core is generated by the generating unit 504, the acquiring unit 507 has a function of acquiring the synchronization control information from the given core. For example, the acquiring unit 507 acquires the synchronization control information of the Gr1 register and the CPU number of the CPU #N. The acquired information is stored to the memory area of the register synchronization control apparatus 205#M.

The reading unit 508 has a function of reading in the value of the particular register obtainable from the synchronization control information acquired by the acquiring unit 507 from the particular register of the synchronization source core. For example, the reading unit 508 reads in the value of the register Gr1 from the register Gr1 among the internal register group 203#M of the CPU #M. The read-in value is stored to the memory area of the register synchronization control apparatus 205#M.

The writing unit 509 writes the value read in by the reading unit 508 from the particular register of the synchronization source core, to the particular register of the synchronization destination core. For example, the writing unit 509 writes the value read in from the register Gr1 of the CPU #M, to the register Gr1 among the internal register group 203#N of the CPU #N.

The transmitting unit 510 has a function of transmitting the particular register and the value of the particular register read in by the reading unit 508 to the synchronization destination core. For example, the transmitting unit 510 transmits the register Gr1 and the value of the register Gr1 to the register synchronization control apparatus 205#N.

The receiving unit 511 has a function of receiving the particular register and the value of the particular register from other synchronization control apparatus. For example, the receiving unit 511 receives the register Gr1 and the value of the register Gr1 from the register synchronization control apparatus 205#M. The received register and register value are stored to the memory area of the register synchronization control apparatus 205#N.

Figure 6:
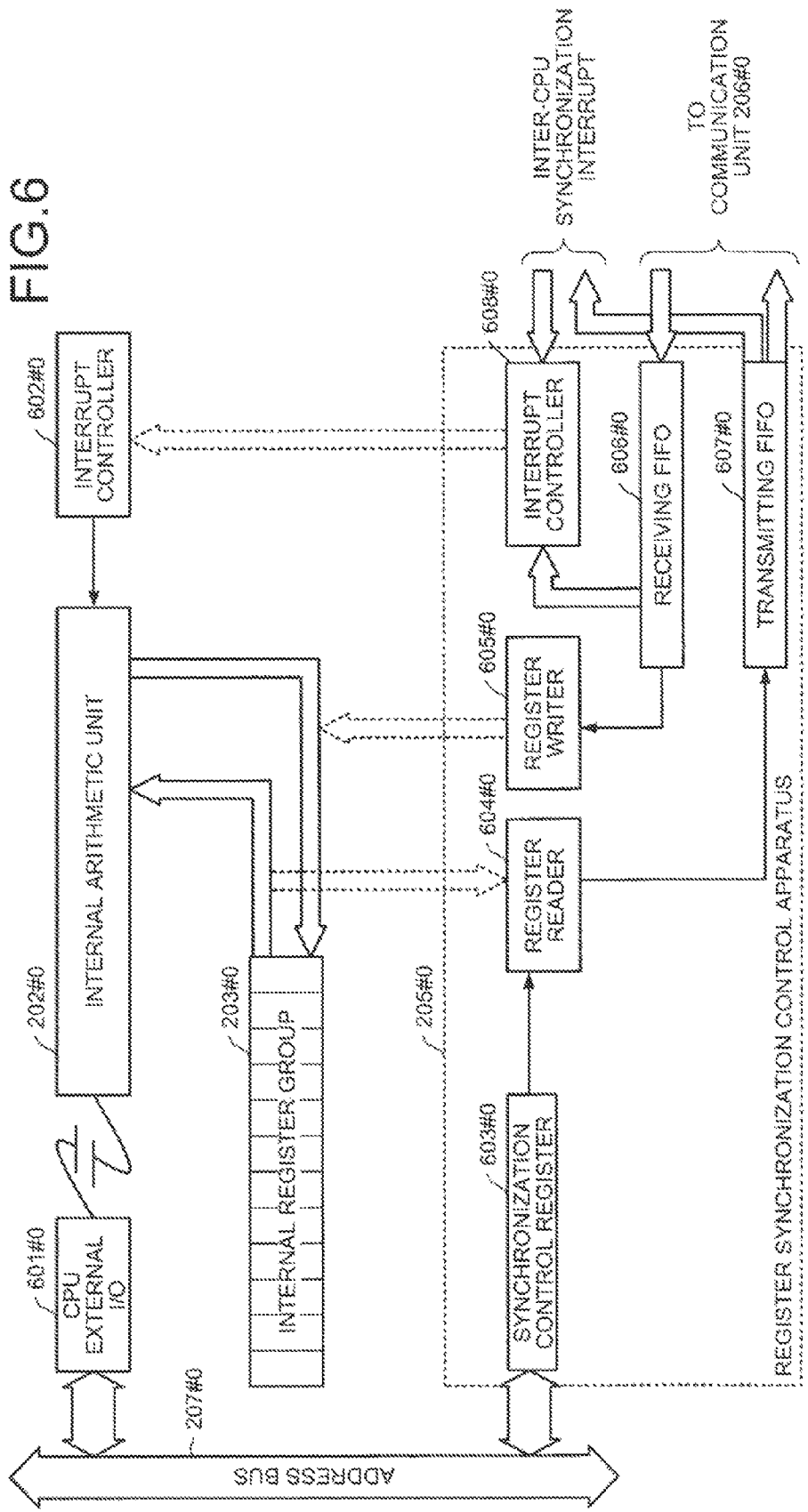
FIG. 6 is an explanatory diagram of an overview of a register synchronization control apparatus 205 at the time of non-occurrence of a synchronization event.

FIG. 6 is an explanatory diagram of an overview of the register synchronization control apparatus 205 at the time of non-occurrence of a synchronization event. FIG. 6 is described using the CPU #0. CPUs other than the CPU #0 components equivalent to those of the CPU #0 illustrated in FIG. 6. The hardware depicted in FIG. 6 includes the internal arithmetic unit 202#0, a CPU external I/O 601#0, an interrupt controller 602#0, the internal register group 203#0, and the register synchronization control apparatus 205#0. The CPU external I/O 601#0 and the register synchronization control apparatus 205#0 are connected by the address bus 207#0. The address bus 207#0 is connected to the cache memory 204#0 and the bus 110, and by way of the bus 110, is connected to the RAM 103 and the registers of peripheral devices, such as the display 107, etc.

The register synchronization control apparatus 205#0 includes a synchronization control register 603#0, a register reader 604#0, a register writer 605#0, a receiving FIFO 606#0, a transmitting FIFO 607#0, and an interrupt controller 608#0. The synchronization control register 603#0 is connected to the address bus 207#0 and the receiving FIFO 606#0 and the transmitting FIFO 607#0 are connected to the communication unit 206#0. The interrupt controller 608#0 is connected to the interrupt controller 602#0.

The multi-core processor system 100 takes the form of the memory-mapped I/O by which an address space of input/output devices coexists in the address space of the RAM 103. It is assumed that the address area of the cache memory 204 is 32 [kilobytes] from 0x00008000 to 0x0000FFFF and that the address area of the RAM 103 is 32 [megabytes] from 0x02000000 to 0x03FFFFFF. The address area from 0x00010000 to 0x01FFFFFF is given as an unallocated area.

For example, the designer sets the address area of the synchronization control register 603#0 in the area of 0x00020000 to 0x00020003 among the unallocated area. This enables the internal arithmetic unit 202 to access the synchronization control register 603#0 by addressing. Even if the multi-core processor system 100 takes the form of the port-mapped I/O by which the address space of the input/output devices does not coexist in the address space of the RAM 103, each CPU can access the synchronization control register 603#0 by accessing the address space of the input/output devices.

The CPU external I/O 601#0 is a port for the internal arithmetic unit 202#0 inputting/outputting data from or to the address bus 207#0. For example, the internal arithmetic unit 202#0 accesses the RAM 103 and the synchronization control register 603#0 by way of the CPU external I/O 601#0.

The interrupt controller 602#0 receives the interrupt signal and notifies the internal arithmetic unit 202#0 of the interrupt number. While, in the example of FIG. 6, the interrupt controller 602#0 receives an input of the interrupt signal from the interrupt controller 608#0, the interrupt controller 602#0 receives other interrupt signals, for example, the interrupt signal from the keyboard 109, and notifies the internal arithmetic unit 202#0 of the interrupt number. The interrupt controller 602#0 has plural interrupt input terminals and the interrupt number set for each terminal.

For example, one certain terminal of the interrupt controller 602#0 receives an interrupt signal from the interrupt controller 608#0 and another terminal receives an interrupt signal from the keyboard 109. In the case of receipt of plural interrupt signals, the interrupt controller 602#0 has a function of notifying the interrupt number in the order of priority set for the interrupt signals.

The synchronization control register 603#0 is a register for setting the synchronization control information including the information of the register to be synchronized and the information of the synchronization destination CPU. The synchronization control register 603#0, different from the accumulators such as the general-purpose register and the floating point register of each CPU, is a register that appears as a type of peripheral device by way of the address bus. The synchronization control register 603#0 establishes coherency among a register group used by a user program, for example, the accumulator, the general-purpose register, and the floating point register. For example, the synchronization control register 603 stores, as the synchronization object register name, the name of the register for which coherency is to be established. Details of the synchronization control information to be set to the synchronization control register 603 will be described with reference to FIG. 7.

From the register name written as the synchronization object register name in the synchronization control register 603#0, the register reader 604#0 reads in the value of the register corresponding to the synchronization object register name, among the internal register group 203#0. For example, when "Gr1" is stored as the synchronization object register name, the register reader 604#0 reads in the value of the Gr1 register of the internal register group 203#0.

The register writer 605#0 receives the register name and the value from the receiving FIFO 606#0 and writes the received value to the register corresponding to the received register name, among the internal register group 203#0. For example, in the case of receipt of the data of "Gr1 1" from the receiving FIFO 606#0, the register writer 605#0 writes "1" to the Gr1 register of the internal register group 203#0.

The receiving FIFO 606#0 stores the register name and the value sent from the communication unit 206#0. To implement barrier synchronization, the receiving FIFO 606#0 notifies the interrupt controller 608 of the interrupt signal as a CPU control after the register writer 605#0 has completed writing to the register.

The transmitting FIFO 607#0 stores the information of the synchronization destination CPU, the register name, and the register value sent from the register reader 604#0. The transmitting FIFO 607#0 transmits the information of the synchronization destination CPU, the register name, and the register value to the communication unit 206#0. At the time of transmitting the register name and the register value, the transmitting FIFO 607#0 transmits the interrupt signal as a synchronization signal.

The interrupt controller 608#0 receives the interrupt signal from a transmitting FIFO 607 other than the transmitting FIFO 607#0 and notifies the interrupt controller 602#0 of the interrupt number. A transmitting FIFO 607 other than the transmitting FIFO 607#0 is, for example, the transmitting FIFO 607#1. The interrupt controller 608#0 receives the interrupt signal from the receiving FIFO 606#0 as well and notifies the interrupt controller 602#0 of the interrupt number. The interrupt controller 608#0 and other interrupt controllers 608 are directly wire-connected, not by way of the communication unit 206.

As for correspondence between the functional units of the register synchronization control apparatus 205 depicted in FIG. 5 and the units depicted in FIG. 6, the acquiring unit 507 corresponds to the synchronization control register 603, the reading unit 508 corresponds to the register reader 604, and the writing unit 509 corresponds to the register writer 605. The transmitting unit 510 corresponds to the transmitting FIFO 607, and the receiving unit 511 correspond to the receiving FIFO 606.

The example of FIG. 6 represents a state in which the synchronization event has not yet occurred and the internal arithmetic unit 202 reads and writes from or to the internal register group 203#40 according to the instruction fetched from the RAM 103.

FIG. 7 is an explanatory diagram of one example of memory contents of the synchronization control register 603. The synchronization control register 603 is an area of 32 [bits] and has three fields of a synchronization flag, the synchronization object register name, and the synchronization destination CPU number. The synchronization control information is composed of the synchronization object register name and the synchronization destination CPU number but may include the synchronization flag. The synchronization flag field is an area of 1 [bit] and stores the flag indicative of whether the register synchronization processing is being executed. Hereinafter, description will be made on the assumption that a synchronization flag of 1 indicates that the synchronization processing is being executed. The synchronization object register name field is an area of 8 [bits] and stores the number of the register to be synchronized. The synchronization destination CPU number field is an area of 8 [bits] and stores the number of the CPU to be synchronized.

The area of each of the synchronization object register name field and the synchronization destination CPU number field is of 8 [bits], which can handle 256 kinds of register or CPU numbers. Even if the number of the CPUs is greater than 256, such a configuration can be dealt with by using a reserve 15 [bits].

The synchronization destination CPU number field normally stores the number of the CPU to be synchronized for unicast but if it is possible that a same register value will be transmitted to plural CPUs, a mode of transmitting to plural CPUs may be set. For example, the synchronization destination CPU number field may be set so that, for example, if 0xFF is stored in the synchronization destination CPU number field, the transmitting FIFO 607 will broadcast the register value to all CPUs excluding its CPU. For example, 1 is stored in the synchronization flag, the register number of the Gr1 register is stored in the synchronization object register name field, and the CPU number of the CPU #1 is stored in the synchronization destination CPU number field.

FIG. 8 is an explanatory diagram of an overview of the register synchronization control apparatus 205 of the synchronization source CPU at the time of occurrence of the synchronization event. Upon occurrence of the synchronization event, the CPU #M as the synchronization source CPU, by a driver 801#M running on the CPU #M, sets the synchronization control information in the synchronization control register 603#M. The synchronization control information is output by the master CPU, for example, the CPU #0.

After the setting, the register reader 604#M, based on the synchronization control information, reads in the register value from the internal register group 203#M and writes the synchronization destination CPU number, the register name, and the register value to a buffer of the transmitting FIFO 607#M. After the writing, the transmitting FIFO 607#M transmits the interrupt signal as the synchronization signal to the interrupt controller 608 of the register synchronization control apparatus 205 of the synchronization destination CPU. In conjunction with the interrupt signal, the transmitting FIFO 607#M transmits the register name and the register value to the receiving FIFO 606 of the register synchronization control apparatus 205 of the synchronization destination CPU. After the transmission, the transmitting FIFO 607#M overwrites the synchronization flag, setting the synchronization flag to 0.

When the CPU #M sets the synchronization control information in the synchronization control register 603#M, the CPU #M may set a part of the synchronization control information beforehand instead of setting all contents of the information at the time of occurrence of the synchronization event. For example, in the case of static scheduling in which the synchronization destination CPU is pre-assigned by the assembler, etc., the CPU #M may set the synchronization object register name and the synchronization destination CPU number before occurrence of the synchronization event and may set the synchronization flag at the time of occurrence of the synchronization event. In the case of dynamic scheduling in which the synchronization destination CPU is determined by a scheduler, the CPU #M sets the synchronization object register name, the synchronization destination CPU number, and the synchronization flag at the time of occurrence of the synchronization event.

FIG. 9 is an explanatory diagram of an overview of the register synchronization control apparatus 205 of the synchronization destination CPU at the time of occurrence of the synchronization event. Upon receipt of the interrupt signal, the interrupt controller 608#N of the CPU #N as the synchronization destination CPU notifies the interrupt controller 602#N of the interrupt number. The internal arithmetic unit 202#N notified of the interrupt number by way of the interrupt controller 602#N generates a synchronization thread and prohibits the input/output to or from the internal register group 203#N.

After receipt of the interrupt signal by the interrupt controller 608#N, the receiving FIFO 606#N acquires the register name and the register value. After the acquisition, the register writer 605#N writes the acquired register value to the internal register group 203#N. After completion of the writing, the receiving FIFO 606#N notifies the interrupt controller 608#N of the interrupt signal as a writing completion notice. Upon receipt of the interrupt signal, the interrupt controller 608#N notifies the interrupt controller 602#N of the interrupt number.

The interrupt number by the interrupt signal from the register synchronization control apparatus 205#M and the interrupt number by the interrupt signal from the receiving FIFO 606#N are preferably be different from each other. With differing interrupt numbers, the internal arithmetic unit 202#N that received the interrupt number from the interrupt controller 602#N and the OS running on the CPU #N can judge the cause that the interrupt number represents.

FIG. 10 is an explanatory diagram of an overview at the time of designing of the multi-core processor system 100. The assembler reads in the assembler source 401 and generates the one-to-one-converted executable object 402. Further, the assembler performs a structural analysis of the assembler source 401 and generates the register dependency table 501. It is possible that the assembler source is mixed as a part of the C/C++ source. Even such a source is treated by the multi-core processor system 100 as the assembler source.

With respect to a specific structural analysis, structural analysis program reads in the assembler source and extracts block structures having a jump or a conditional branch as a joint. Further, the structural analysis program extracts the address space on the registers and the memories finally read or written as input/output data of each block. Then, the structural analysis program, using the input/output data, defines a case in which, as input/output values between blocks, the register instead of the address space is used as the block having a register dependency relationship. The structural analysis program outputs two blocks having a register dependency relationship and a register determined to have the dependency relationship as one record in the register dependency table 501.

The register dependency table 501 is information describing the name of the register having dependency relationship between the blocks. For example, the register dependency table 501 has three fields, respectively for a synchronization source block name, a synchronization destination block name, and a dependency register name.

The synchronization source block name field stores the information of the block as a synchronization source thread and the synchronization destination block name field stores the information of the block as a synchronization destination thread. In the example of FIG. 4, the synchronization source block name field and the synchronization destination block name field store, for example, the names of the block 405 and the block 406, respectively. A beginning address and an ending address of the block may be stored in place of the name of the block. The dependency register name field stores the name of the register having the dependency relationship between the blocks stored in the synchronization source block name field and the synchronization destination block name field. In the example of FIG. 4, the dependency register name field stores a character string of "Gr1".

FIG. 11 is a flowchart of scheduling. The flowcharts depicted in FIGS. 11 and 12 assume that the scheduling of the threads of the multi-core processor system 100 as a whole is performed by the CPU #0 as the master CPU and that the synchronization source thread is executed by the CPU #M. The CPU #M and the CPU #0 may be a same CPU.

The CPU #0 determines the type of the event (step S1101). If the type of the event is re-scheduling (step S1101: RE-SCHEDULING), the CPU #0 determines if the executable object to be re-scheduled is described in the assembler source (step S1102). As for criteria for making the determination, the CPU #0 can refer to the register dependency table 501. For example, if the executable object of the synchronization source thread is present in the synchronization source block name field and if the executable object to be re-scheduled is present in the synchronization destination block name field, the CPU #0 determines that the executable object to be re-scheduled is described in the assembler source.

An event causing re-scheduling is, for example, a case in which the load of the CPUs 101 becomes unbalanced. When the load becomes unbalanced and a particular CPU is overloaded, the load can be equalized by migrating the thread being executed by the overloaded CPU to a less loaded CPU. If the executable object to be re-scheduled is described in the assembler source (step S1102: YES), the CPU #0 sets the CPU #N to be allocated the migrated thread after re-scheduling as the synchronization destination CPU (step S1103). In the case of the path through step S1102: YES, a synchronization event has occurred of synchronizing the register between two CPUs.

If the type of the event is a thread start (step S1101: THREAD START), the CPU #0 determines if the executable object of a new thread is described in the assembler source (step S1104). For example, if the executable object of the synchronization source thread is present in the synchronization source block name field and if the executable object of the new thread is present in the synchronization destination block name field, the CPU #0 determines that the executable object of the new thread is described in the assembler source.

Among causes of the occurrence of a threat start, a factor particularly specific to parallel execution is, for example, a case in which the block of the executable object is recursive processing. For example, when a particular block is to perform given processing 100 times, the synchronization source thread executes the processing 50 times and further, the synchronization destination thread as the new thread executes the processing 50 times.

If the executable object of the new thread is described in the assembler (step S1104: YES), the CPU #0 sets the CPU #N to which the new thread is allocated as the synchronization destination CPU (step S1105). In the case of the path through step S1104: YES, a synchronization event, has occurred of synchronizing the register between two CPUs. After the operation at step S1103 or step S1105, the CPU #0 generates the synchronization control information from the synchronization object register name, the synchronization destination CPU number, and the synchronization flag (step S1106).

The CPU #0 acquires the synchronization object register name from the value stored in the dependency register name field of the record in which the synchronization source block name field and the synchronization destination block name field are present, of the register dependency table 501. After the generation, the CPU #0 outputs the generated synchronization control information to the synchronization control register 603#M of the register synchronization control apparatus 205#M of the CPU #M as the synchronization source CPU (step S1107).

For example, the CPU #0 notifies the driver 801#M running on the CPU #M of the synchronization control information and consequent to the execution of the driver 801#M, the synchronization control information is set in the synchronization control register 603#M. After setting of the synchronization control information in the synchronization control register 603#M, the CPU #0 transitions to the operation at step S1101.

If the event is an event other than re-scheduling or thread start (step S1101: OTHERS), the CPU #0 executes normal scheduling according to the event (step S1108). Also in the case of no description in the assembler source (step S1102: NO, step S1104: NO), the CPU #0 executes the operation at step S1108. An event other than re-scheduling and thread start is a case in which the time slice of the thread expires, a case in which the thread is finished, etc.

The register synchronization control apparatus 205#M of the CPU #M as the synchronization source CPU executes the register synchronization control processing, based on the synchronization control information output by the operation at step S1107 (step S1109). The register synchronization control apparatus 205#N of the CPU #N as the synchronization destination CPU as well executes the register synchronization control processing in conjunction with the register synchronization control apparatus 205#M. Details of the register synchronization control processing will be described with reference to FIG. 12.

FIG. 12 is a flowchart of the register synchronization control processing. The register synchronization control apparatus 205#M acquires the synchronization object register name and the synchronization destination CPU name from the synchronization control register 603#M (step S1201). After the acquisition, the register synchronization control apparatus 205#M, by the register reader 604#M, reads in the value of the register corresponding to the synchronization object register name from the internal register group 203#M (step S1202). The register synchronization control apparatus 205#M, by the transmitting FIFO 607#M, transmits an interrupt signal and the synchronization object register name and value to the register synchronization control apparatus 205#N corresponding to the synchronization destination CPU name (step S1203). After the transmission, the register synchronization control apparatus 205#M sets the synchronization flag to 0, ending the register synchronization control processing as the register synchronization source.

The register synchronization control apparatus 205#N, by the interrupt controller 608#N, receives the interrupt signal (step S1204). Upon receipt of the interrupt signal, the register synchronization control apparatus 205#N, by the interrupt controller 608#N, notifies the interrupt controller 602#N of the interrupt number indicative of receipt of the register value (step S1205). After the notification, the register synchronization control apparatus 205#N, by the receiving FIFO 606#N, receives the synchronization object register name and value (step S1206).

After the receipt, the register synchronization control apparatus 205#N, by the register writer 605#N, writes the received register value to the register corresponding to the synchronization object register name among the internal register group 203#N (step S1207). After the writing, the register synchronization control apparatus 205#N, by the interrupt controller 608#N, notifies the interrupt controller 602#N of the interrupt number indicative of completion of the writing (step S1208). After the notification, the register synchronization control apparatus 205#N ends the register synchronization control processing as the register synchronization destination. The CPU #N that has received the interrupt number by the operation at step S1205 generates and starts the new thread or starts the re-scheduled thread (step S1209).

In the operation at step S1207, since the register synchronization control apparatus 205#N is accessing the internal register group 203#N, the CPU #N is prohibited from accessing the internal register group 203#N. Therefore, at the stage of completion of the operation at step S1209, the new thread or the re-scheduled thread cannot access the internal register group 203#N and the thread is not yet in the executable state.

The CPU #N that has received the interrupt number by the operation at step S1208 starts accessing the internal register group 203#N (step S1210). With the CPU #N now being capable of accessing the internal register group 203#N, the new thread or the re-scheduled thread is set in the executable state.

As described above, according to the multi-core processor system, the synchronization control system, the synchronization control apparatus, the information generating method, and the information generating program, in the case of migration the thread of the synchronization source core to the synchronization destination core, a register associated with a thread is identified. Then, the multi-core processor system passes the value of the identified register from the synchronization source core to the synchronization destination core, thereby enabling the multi-core processor system to perform, by multiple cores, parallel execution of the assembler source generated for a single core, without modification of the assembler source and to ensure inheritance of the assembler source.

In the case of writing the value read in from a particular register of the synchronization source core, the multi-core processor system may, after notifying the information that the thread detected by the synchronization destination core has become executable, set the detected thread in the executable state, thereby enabling the multi-core processor system to execute the thread after the register of the synchronization destination core has inherited the value of the register of the synchronization source core and the thread of the synchronization destination core has come to the properly operable state.

In the multi-core processor system, the register in the table that identifies the combination with the register associated with the thread is not required to identify any core of the multi-core processor. In the source generated for a single core, since there is only one core, the information indicating associations between registers and CPUs does not exist. The multi-core processor system can determine a thread to be an executable object generated from the source for a single core, based on the fact that the register in the table does not identify any core of the multi-core processor.

In the multi-core processor system, the table identifying the combination with the register associated with the thread is not required to identify other memory area than the register. The executable object by C++ source is additionally provided with the synchronization control code to save the data in the cache memory or the RAM at a subsequent block and to read in the saved data at a preceding block, between the blocks having the dependency relationship. The executable object by the assembler source, however, is not additionally provided with the synchronization control code and does not access memory area other than the register between the blocks having the dependency relationship. Therefore, the multi-core processor system can determine an object to be an executable object generated from the assembler source, based on the fact that the table does not specify other memory area than the register.

When it is detected that the second thread branched from the first thread of the synchronization source core is generated by the synchronization destination core, the multi-core processor system may copy the register value from the synchronization source core to the synchronization destination core, thereby enabling the multi-core processor system to perform, by multiple cores, parallel execution of the assembler source generated for a single core, without modification, even when the new thread is generated.

The number of clocks for processing the synchronization control according to the conventional technology 2 has been about 100 to 1000 clocks. The number of clocks for processing the synchronization control according to this embodiment, including the operation of the synchronization control register, is on the order of 10 clocks and 90 to 99% efficiency can be achieved for one time of synchronization control. For example, assuming that there is a CPU operating at the clock frequency of 500 [MHz], while the processing time of the synchronization control according to the conventional technology 2 is on the order of 0.2 to 2 [microseconds] for one time, the processing of the synchronization control according to this embodiment is completed on the order of 20 [nanoseconds]. If the occurrence rate of the synchronization control is on the order of one time per 1 [microsecond], efficiency improvement of about 10% is achieved for the multi-core processor system.

The information generating method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The multi-core processor system, synchronization control system, synchronization control apparatus, information generating method, and information generating program enable normal parallel execution of an assembler source for a single core, by multiple cores and without modification.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising:
a given core that includes:
a detecting unit that detects migration of a thread under execution by a synchronization source core to a synchronization destination core in the multi-core processor,
an identifying unit that refers to a table identifying a combination of a thread of a thread group and a register associated with the thread, and identifies a particular register corresponding to the thread for which migration was detected by the detecting unit, wherein the table does not specify a memory area other than a register, and
a generating unit that generates synchronization control information identifying the synchronization destination core and the particular register identified by the identifying unit; and
a synchronization controller that, communicably connected to the multi-core processor, acquires from the given core, the synchronization control information generated by the generating unit, reads in from the particular register of the synchronization source core, a value of the particular register obtainable from the synchronization control information, and writes to the particular register of the synchronization destination core, the value read in from the particular register of the synchronization source core.

2. A multi-core processor system comprising:
a core that includes:
a detecting unit that detects generation of a second thread branched from a first thread under execution by a synchronization source core in a synchronization destination core inside the multi-core processor,
an identifying unit that refers to a table identifying a combination of a thread of a thread group and a register associated with the thread, and identifies a particular register corresponding to the first and the second threads, wherein the tables does not specify a memory area other than a register, and a generating unit that generates synchronization control information identifying the synchronization destination core and the particular register identified by the identifying unit; and a synchronization controller that, communicably connected to the multi-core processor, acquires from the given core, the synchronization control information generated by the generating unit, reads in from the particular register of the synchronization source core, a value of the particular register obtainable from the synchronization control information, and writes to the particular register of the synchronization destination core, the value read in from the particular register of the synchronization source core.

3. The multi-core processor system according to claim 1, wherein, the given core includes a setting unit that sets the detected thread to a state executable by the synchronization destination core, the synchronization controller upon writing the value read in from the particular register of the synchronization source core, notifies the synchronization destination core of information that the detected thread has become executable, and the setting unit upon receiving from the synchronization controller, the information that the detected thread has become executable, sets the detected thread in the state executable by the synchronization destination core.

4. The multi-core processor system according to claim 1, wherein the register associated with the thread in the table does not identify any core of the multi-core processor.

5. A synchronization control system communicably connected to a multi-core processor, the synchronization control system comprising:

an acquiring unit that, by a given core in the multi-core processor, detects migration of a thread under execution by a synchronization source core to a synchronization destination core in the multi-core processor and acquires synchronization control information identifying a particular register corresponding to the thread under execution and the synchronization destination core based on a table, wherein the table does not specify a memory area other than a register;

a reading unit that reads in from the particular register of the synchronization source core, a value of the particular register obtainable from the synchronization control information acquired by the acquiring unit; and a writing unit that writes to the particular register of the synchronization destination core, the value read in by the reading unit from the particular register of the synchronization source core.

6. An arbitrary synchronization control apparatus among a group of synchronization control apparatuses communicably connected to cores of a multi-core processor, the synchronization control apparatus comprising:

an acquiring unit that, when a connected given core communicable with the synchronization control apparatus is a synchronization source core that migrates to a synchronization destination core, a thread under execution by the given core, acquires synchronization control information identifying a particular register corresponding to the thread under execution and the synchronization destination core, from the given core in the multi-core processor and executing the migration, based on a table, wherein the tables does not specify a memory area other than a register;

a reading unit that, when the given core is the synchronization source core, reads in from the particular register of the synchronization source core, the value of the particular register obtainable from the synchronization control information acquired by acquiring unit;

a transmitting unit that, when the given core is the synchronization source core, transmits identification information of the particular register and the value of the particular register to the synchronization control apparatus of the synchronization destination core, among the group of the synchronization control apparatuses;

a receiving unit that, when the given core is the synchronization source core, receives the identification information of the particular register and the value of the particular register from the synchronization control apparatus connected to the synchronization source core, among the group of the synchronization control apparatuses; and a writing unit that, when the given core is the synchronization source core, writes the value of the particular register received by the receiving unit to the particular register of the synchronization destination core.

7. An information generating method executed by a given core in a multi-core processor, the information generating method comprising:

detecting migration of a thread under execution by a synchronization source core to a synchronization destination core in the multi-core processor;

referring to a table identifying a combination of a thread of a thread group and a register associated with the thread, and identifying a particular register corresponding to the thread for which migration has been detected, wherein the table does not specify a memory area other than a register;

generating synchronization control information identifying the particular register and the synchronization destination core; and outputting the generated synchronization control information to a synchronization control apparatus of the synchronization source core, among a group of synchronization control apparatuses that control synchronization between registers of cores of the multi-core processor.

8. A non-transitory computer-readable recording medium storing an information generating program that causes a given core in a multi-core processor to execute a process comprising:

detecting migration of a thread under execution by a synchronization source core to a synchronization destination core in the multi-core processor;

referring to a table identifying a combination of a thread of a thread group and a register associated with the thread, and identifying a particular register corresponding to the thread for which migration has been detected, wherein the table does not specify a memory area other than a register;

generating synchronization control information identifying the particular register and the synchronization destination core; and outputting the generated synchronization control information to a synchronization control apparatus of the synchronization source core, among a group of synchronization control apparatuses that control synchronization between registers of cores of the multi-core processor.

* * * * *